United States Patent [19]

Brann et al.

[11] Patent Number: 5,741,858

[45] Date of Patent: Apr. 21, 1998

[54] SILANE-CROSSLINKABLE ELASTOMER-POLYOLEFIN POLYMER BLENDS THEIR PREPARATION AND USE

[75] Inventors: Jeffery E. Brann, Lake Jackson; Morgan M. Hughes, Angleton, both of Tex.; Stephen H. Cree, Geneva; John Penfold, Uetliburg, both of Switzerland

[73] Assignee: The Dow Chemical Company, Midland, Mich.

[21] Appl. No.: 657,926

[22] Filed: May 31, 1996

Related U.S. Application Data

[63] Continuation-in-part of PCT/US95/04901, Apr. 20, 1995 which is a continuation-in-part of Ser. No. 230,364, Apr. 20, 1994, abandoned.

[51] Int. Cl.$^6$ ............................................. C08L 23/26
[52] U.S. Cl. ............................ 525/101; 525/193; 525/288
[58] Field of Search .............................. 525/193, 288, 525/101

[56] References Cited

U.S. PATENT DOCUMENTS

| | | | |
|---|---|---|---|
| 3,645,992 | 2/1972 | Elston | 260/80.78 |
| 3,646,155 | 2/1972 | Scott et al. | 260/827 |
| 4,104,210 | 8/1978 | Coran et al. | 260/4 R |
| 4,144,202 | 3/1979 | Ashcraft et al. | 252/63.2 |
| 4,412,042 | 10/1983 | Matsuura et al. | 525/260 |
| 4,500,648 | 2/1985 | Malpass | 502/115 |
| 4,618,654 | 10/1986 | Schmidtchen et al. | 525/288 |
| 4,798,081 | 1/1989 | Hazlitt et al. | 75/53 |
| 4,870,136 | 9/1989 | Yagi et al. | 525/288 |
| 4,902,460 | 2/1990 | Yagi et al. | 264/83 |
| 4,950,541 | 8/1990 | Tabor et al. | 428/373 |
| 4,985,502 | 1/1991 | Izumi et al. | 525/194 |
| 5,037,868 | 8/1991 | Saito et al. | 524/93 |
| 5,089,321 | 2/1992 | Chum et al. | 428/218 |
| 5,211,556 | 5/1993 | Kobayashi et al. | 433/72 |
| 5,244,976 | 9/1993 | Brosius et al. | 525/193 |
| 5,246,783 | 9/1993 | Spenadel et al. | 428/461 |
| 5,266,627 | 11/1993 | Meverden et al. | 524/527 |
| 5,272,236 | 12/1993 | Lai et al. | 526/348.5 |
| 5,278,272 | 1/1994 | Lai et al. | 526/348.5 |
| 5,380,810 | 1/1995 | Lai et al. | 526/352 |
| 5,384,369 | 1/1995 | Brosius et al. | 525/193 |
| 5,414,040 | 5/1995 | McKay et al. | 524/576 |

FOREIGN PATENT DOCUMENTS

| | | |
|---|---|---|
| 0 002 830 | 7/1979 | European Pat. Off. . |
| 0 229 477 | 7/1987 | European Pat. Off. . |
| 79-14760B | 6/1971 | Japan . |
| 2 098 999 | 12/1982 | United Kingdom . |
| WO A 94 06858 | 3/1994 | WIPO . |

OTHER PUBLICATIONS

Ramamurthy, *Journal of Rheology*, 30(2), 337–357 (1986).
Randall, *Rev. Macromol. Chem. Phys.*, C29 (2&3), pp. 285–297.
Wild, et al., *Journal of Polymer Science*, Poly. Phys. Ed., vol. 20, p. 441 (1982).

*Primary Examiner*—Ralph H. Dean

[57] ABSTRACT

Molded articles of silane-crosslinked blends comprising a polyolefin elastomer and a crystalline polyolefin polymer exhibit desirable tensile strength and/or compression set properties, and are prepared by (i) blending a low density polyolefin elastomer with a crystalline polyolefin polymer, (ii) grafting the blend with a silane crosslinker, (iii) shaping the silane-grafted blend into the molded article, and (iv) curing the shaped, silane-grafted blend with water, preferably in the presence of a cure catalyst.

19 Claims, 2 Drawing Sheets

SILANE-CROSSLINKABLE ELASTOMER-POLYOLEFIN POLYMER BLENDS THEIR PREPARATION AND USE

CROSS-REFERENCE TO RELATED APPLICATIONS

This application is a continuation-in-part of PCT/US95/04901, filed Apr. 20, 1995, which designated the United States, which is a continuation-in-part of application Ser. No. 08/230,364, filed Apr. 20, 1994, now abandoned.

FIELD OF THE INVENTION

This invention relates to crosslinkable polymer compositions exhibiting desirable tensile strength and compression set. In one aspect, the invention relates to compositions comprising a blend of a polyolefin elastomer and a crystalline polymer while in another aspect, the invention relates to such blends which are grafted with and crosslinked through a vinyl silane. In yet other aspects, the invention relates to a process for making and applications for using these silane crosslinked polymer blends.

BACKGROUND OF THE INVENTION

For many applications, e.g. wire and cable insulation, weatherstripping, fibers, seals, gaskets, foams, footware, flexible tubing, pipes, bellows, tapes, etc., certain selected properties (e.g. tensile strength and compression set) of articles manufactured from one or more polyolefins can be enhanced by introducing chemical linkages between the polymeric molecular chains which constitute the polymer, during, or preferably following, the shaping or molding process. These chemical linkages between different polymeric molecular chains are generally known as "crosslinks". Crosslinks can be introduced between different molecular chains of a polyolefin by a number of mechanisms, one of which is to graft to the individual polymer backbones or chains that constitute the bulk polymer with a chemically reactive compound in such a manner that the grafted compound on one backbone may subsequently react with a similar grafted compound on another backbone to form the crosslink. Exemplary of this method is the "silane crosslinking" method.

Suitable silanes for the silane crosslinking process include those of the general formula in which R' is a hydrogen atom or methyl group; x and y are 0 or 1 with the proviso that when x is 1, y is 1; n is an integer from 1 to 12 inclusive, preferably 1 to 4, and each R independently is a hydrolysable organic group such as an alkoxy group having from 1 to 12 carbon atoms (e.g. methoxy, ethoxy, butoxy), aryloxy group (e.g. phenoxy), aralkoxy group (e.g. benzyloxy), aliphatic acyloxy group having from 1 to 12 carbon atoms (e.g. formyloxy, acetyloxy, propanoyloxy), amino or substituted amino groups (alkylamino, arylamino), or a lower alkyl group having 1 to 6 carbon atoms inclusive, with the proviso that not more than two of the three R groups is an alkyl (e.g., vinyl dimethyl methoxy silane). Silanes useful in curing silicones which have ketoximino hydrolysable groups, such as vinyl tris(methylethylketoximino)silane, are also suitable for the cross-linking process. Such silanes may be grafted to a suitable polyolefin by the use of a suitable quantity of organic peroxide or other radical source such as E-beam treatment, either before or during a shaping or molding operation. Additional ingredients such as heat and light stabilizers, pigments, etc., may also be included in the formulation. In any case, the crosslinking reaction takes place following the shaping or molding step by reaction between the grafted silane groups and water, the water permeating into the bulk polymer from the atmosphere or from a water bath or "sauna". It is also possible to generate the water needed for cure internally by decomposition of a suitable additive such as aluminum hydroxide. The phase of the process during which the crosslinks are created is commonly referred to as the "cure phase" and the process itself is commonly referred to as "curing".

U.S. Pat. No. 4,412,042 to Matsuura, et al., which is incorporated herein by reference, describes a silane crosslinked ethylene/α-olefin copolymer prepared by contacting a silane modified ethylene/α-olefin copolymer with water in the presence of a silanol condensation catalyst. The ethylene/α-olefin copolymer has a density of 0.850 to 0.910 g/cm³, and is prepared by copolymerizing ethylene with an α-olefin of 3 to 12 carbon atoms in a vapor phase without solvent and in the presence of a catalyst comprising an organoaluminum compound and a solid substance containing magnesium in combination with at least one of titanium and vanadium.

U.S. Pat. No. 4,870,136 to Yagi, et al., which is also incorporated herein by reference, teaches that if ultra-high molecular weight polyethylene having an intrinsic viscosity (0) of at least 5 dl/g is (i) grafted with a silane compound in the presence of a free radical initiator, and (ii) extrusion-molded, and (iii) the extrudate impregnated with a silanol condensation catalyst after or during drawing, and (iv) then exposed to water to effect crosslinking, a novel molecularly-oriented molded article is obtained.

While these and other silane-crosslinked compositions are all useful to one extent or another, the plastic molded article industry has a continuing interest in new products, particularly products that demonstrate enhanced tensile strength and/or compression set relative to conventional crosslinked polyethylene.

SUMMARY OF THE INVENTION

The articles of this invention are shaped (typically molded), silane-crosslinked blends comprising a polyolefin elastomer and a crystalline polyolefin polymer. These articles exhibit desirable tensile strength and/or compression set properties, and are prepared by (i) blending a low density polyolefin elastomer with a crystalline polyolefin polymer, (ii) grafting the blend with a silane crosslinker, (iii) shaping the silane-grafted blend into the article, and (iv) curing the shaped, silane-grafted blend with water in the presence of a cure catalyst.

In one embodiment of this invention, the polyolefin elastomer is an ethylene/α-olefin copolymer or an ethylene/α-olefin/diene terpolymer with a density of less than 0.885 g/cc. Preferably, the elastomer is a homogeneous ethylene/α-olefin copolymer, more preferably a substantially linear ethylene/α-olefin copolymer characterized as having:

(i) a melt flow ratio, $I_{10}/I_2 \geq 5.63$;

(ii) a molecular weight distribution, $M_w/M_n$, defined by the equation:

$M_w/M_n \leq (I_{10}/I_2) - 4.63$; and (iii) a critical shear rate at onset of surface melt fracture of at least 50 percent greater than the critical shear rate at the onset of surface melt fracture of a linear olefin polymer having about the same density, $I_2$ and $M_w/M_n$.

If the elastomer is a terpolymer, then preferably it comprises ethylene, a $C_3$—$C_8$ α-olefin, and one of dicyclopentadiene, 1,4-hexadiene, piperylene or 5-ethylidene-2-norbornene as the diene.

In another embodiment of this invention, the crystalline polyolefin polymer has a percent crystallinity of about 40% or greater, preferably with a melting point in excess of about 100° C. Preferably, the crystalline polyolefin polymer is high density (e.g. greater than about 0.940 g/cc) polyethylene or crystalline polypropylene.

The elastomer/crystalline polymer blend comprises at least about 70 weight percent (wt %) elastomer and not in excess of about 30 wt % crystalline polymer. Each polymer component of the blend is grafted with a silane of formula (I) above, e.g. vinyl trimethoxysilane or vinyl triethoxysilane, under free radical conditions, the silane-grafted blend then shaped by any means, e.g. extrusion, injection or compression molding, etc., and cured, preferably in the presence of a cure catalyst such as dibutyl tin dilaurate, with water (typically either by exposure to atmospheric moisture, optionally in a "sauna", or by immersion in a hot water bath). One embodiment of the invention is the precursor of the cured article, i.e. the silane-grafted blend before it is substantially crosslinked.

In one process embodiment of this invention, the crosslinkable articles are prepared by silane-grafting the polymer blend (i.e. reactive processing) followed by a separate molding, preferably extrusion, process step (i.e. article fabrication). In another and preferred process embodiment of this invention, the reactive processing step and molding step are combined within the same silane grafting and article fabrication processing step.

In one fabricated article embodiment of this invention, the curable silane-grafted polymer blend is extruded as a flexible, plastic sheath about a wire or cable to provide a insulation sheath. In another fabricated article embodiment of this invention, the curable silane-grafted polymer is shaped into a flexible weatherstrip, fiber, shoe sole, gasket, or the like.

DESCRIPTION OF THE PREFERRED EMBODIMENTS

The polyolefin blends of this invention comprise two or more, typically two, polyolefin components, i.e. at least one polyolefin elastomer and at least one crystalline polyolefin. The polyolefin elastomer has a density not in excess of about 0.885 g/cc, preferably not in excess of about 0.870 g/cc, and more preferably not in excess of about 0.860 g/cc. The crystalline polyolefin has a percent crystallinity of at least about 40%, preferably at least about 50%, preferably in combination with a melting point of greater than about 100° C., preferably greater than about 120° C.

The polyolefin elastomer component of the blend is typically a copolymer of ethylene and an α-olefin or a terpolymer of ethylene, an α-olefin and a diene. If the former, then preferably the copolymers used in the practice of this invention comprise between about 95 and 35 weight percent (wt %) ethylene, and about 5 and 65 wt % of at least one α-olefin comonomer, more preferably 25 to 65 wt % of at least one α-olefin comonomer. The comonomer content is measured using infrared spectroscopy according to ASTM D-2238 Method B. Typically, the substantially linear ethylene polymers are copolymers of ethylene and an α-olefin of 3 to about 20 carbon atoms (for example, propylene, 1-butene, 1-hexene, 4-methyl-1-pentene, 1-heptene, 1-octene, styrene, etc.), preferably of 3 to 10 carbon atoms, and more preferably these polymers are a copolymer of ethylene and 1-octene.

The ethylene/α-olefin copolymers can be either heterogeneously branched or homogeneously branched. These heterogeneously branched copolymers, i.e. polyethylenes, fall into two broad categories, those prepared with a free radical initiator at high temperature and high pressure, and those prepared with a coordination catalyst at high temperature and relatively low pressure. The former are generally known as low density polyethylenes (LDPE) and are characterized by branched chains of polymerized monomer units pendant from the polymer backbone. LDPE polymers are generally not used in the practice of this invention because typically they are not elastomeric in nature but to the extent that LDPE polymers are available with a density less than about 0.885 g/cc, then they can be used as the elastomer component of this invention.

Ethylene polymers and copolymers prepared by the use of a coordination catalyst, such as a Ziegler or Phillips catalyst, are generally known as linear polymers because of the substantial absence of branch chains of polymerized monomer units pendant from the backbone. High density polyethylene (HDPE), generally having a density of about 0.941 to about 0.965 g/cc, is typically a homopolymer of ethylene, and it contains relatively few branch chains relative to the various linear copolymers of ethylene and an α-olefin. HDPE is well known, commercially available in various grades, and while it is not useful in this invention as the polyolefin elastomer (because of its relatively high density), it is useful as the crystalline polyolefin component of the polymer blend.

Linear copolymers of ethylene and at least one α-olefin of 3 to 12 carbon atoms, preferably of 4 to 8 carbon atoms, are also well known, commercially available and useful in this invention. As is well known in the art, the density of a linear ethylene/α-olefin copolymer is a function of both the length of the α-olefin and the amount of such monomer in the copolymer relative to the amount of ethylene, the greater the length of the α-olefin and the greater the amount of α-olefin present, the lower the density of the copolymer. Linear low density polyethylene (LLDPE) is typically a copolymer of ethylene and an α-olefin of 3 to 12 carbon atoms, preferably 4 to 8 carbon atoms (e.g., 1-butene, 1-hexene, 1-octene, etc.), that has sufficient α-olefin content to reduce the density of the copolymer to that of LDPE. When the copolymer contains even more α-olefin, the density will drop below about 0.91 g/cc and these copolymers are known as ultra low density polyethylene (ULDPE) or very low density polyethylene (VLDPE). The densities of these linear polymers generally range from about 0.87 to 0.91 g/cc.

Both the materials made by the free radical catalysts and by the coordination catalysts are well known in the art, as are their methods of preparation. Relevant discussions of both of these classes of materials, and their methods of preparation, are found in U.S. Pat. No. 4,950,541 and the patents to which it refers, all of which are incorporated herein by reference.

The homogeneously branched polyethylenes that can be used in the practice of this invention also fall into two broad categories, the linear homogeneously branched and the substantially linear homogeneously branched. Both are known. The former and their method of preparation are described in U.S. Pat. No. 3,645,992 to Elston, and the latter and their method of preparation are fully described in U.S. Pat. Nos. 5,272,236, 5,278,272 and 5,380,810 all of which are incorporated into and made a part of this application by reference. Examples of the former are the Tafmer™ polymer of Mitsui and the Exact™ polymer of Exxon, while an example of the latter are the polymers made by the Insite™ Process and Catalyst Technology of The Dow Chemical Company.

As here used, "substantially linear" means that the bulk polymer is substituted, on average, with about 0.01 long-chain branches/1000 total carbons (including both backbone and branch carbons) to about 3 long-chain branches/1000 total carbons, preferably from about 0.01 long-chain branches/1000 total carbons to about 1 long-chain branch/1000 total carbons, more preferably from about 0.05 long-chain branches/1000 total carbons to about 1 long-chain branch/1000 total carbons, and especially from about 0.3 long chain branches/1000 total carbons to about 1 long chain branches/1000 total carbons.

"Long-chain branches" or "long-chain branching" (LCB) means a chain length of at least one (1) carbon less than the number of carbons in the comonomer, as opposed to "short chain branches" or "short chain branching" (SCB) which means a chain length two (2) less than the number of carbons in the comonomer. For example, an ethylene/1-octene substantially linear polymer has backbones with long chain branches of at least seven (7) carbons in length, but it also has short chain branches of only six (6) carbons in length, whereas an ethylene/1-hexene substantially linear polymer has long chain branches of at least five (5) carbons in length but short chain branches of only four (4) carbons in length. LCB can be distinguished from SCB by using $^{13}C$ nuclear magnetic resonance (NMR) spectroscopy and to a limited extent, e.g. for ethylene homopolymers, it can be quantified using the method of Randall (*Rev. Macromol. Chem. Phys.*, C29 (2&3), p.285–297). However as a practical matter, current $^{13}C$ NMR spectroscopy cannot determine the length of a long-chain branch in excess of about six (6) carbon atoms and as such, this analytical technique cannot distinguish between a seven (7) and a seventy (70) carbon branch. The LCB can be about as long as about the same length as the length of the polymer backbone.

U.S. Pat. No. 4,500,648, which is incorporated herein by reference, teaches that LCB frequency can be represented by the equation $LCB=b/M_w$ in which b is the weight average number of LCB per molecule and $M_w$ is the weight average molecular weight. The molecular weight averages and the LCB characteristics are determined by gel permeation chromatography (GPC) and intrinsic viscosity methods.

One measure of the SCB of an ethylene copolymer is its SCBDI (Short Chain Branch Distribution Index), also known as CDBI (Composition Distribution Branch Index), which is defined as the weight percent of the polymer molecules having a comonomer content within 50 percent of the median total molar comonomer content. The SCBDI or CDBI of a polymer is readily calculated from data obtained from techniques know in the art, such as temperature rising elution fractionation (TREF) as described, for example, in Wild et al., *Journal of Polymer Science*, Poly. Phys. Ed., Vol. 20, p.441 (1982), or as described in U.S. Pat. No. 4,798,081 which is incorporated herein by reference. The SCBDI or CDBI for the substantially linear ethylene polymers useful in the present invention is typically greater than about 30 percent, preferably greater than about 50 percent, more preferably greater than about 80 percent, and most preferably greater than about 90 percent.

"Polymer backbone" or just "backbone" means a discrete molecule, and "bulk polymer" or just "polymer" means the product that results from a polymerization process and for substantially linear polymers, that product may include both polymer backbones having LCB and polymer backbones without LCB. Thus a "bulk polymer" includes all backbones formed during polymerization. For substantially linear polymers, not all backbones have LCB but a sufficient number do such that the average LCB content of the bulk polymer positively affects the melt rheology (i.e. the melt fracture properties).

These unique polymers, known as "substantially linear ethylene polymers", are prepared by using constrained geometry catalysts and are characterized by a narrow molecular weight distribution and if an interpolymer, by a narrow comonomer distribution. As here used, "interpolymer" means a polymer of two or more comonomers, for example, a copolymer, terpolymer, etc., or in other words, a polymer made by polymerizing ethylene with at least one other comonomer. Other basic characteristics of these substantially linear ethylene polymers include a low residuals content (that is, low concentrations in the substantially linear ethylene polymer of the catalyst used to prepare the polymer, unreacted comonomers, and low molecular weight oligomers made during the course of the polymerization), and a controlled molecular architecture which provides good processability even though the molecular weight distribution is narrow relative to conventional olefin polymers.

The melt flow ratio, measured as $I_{10}/I_2$ (ASTM D-1238 condition 190/10 for $I_{10}$ and condition 190/2.16 for $I_2$), of these substantially linear ethylene polymers is greater than or equal to 5.63, and is preferably from 6.5 to 15, more preferably from 7 to 10. The molecular weight distribution ($M_w/M_n$), measured by gel permeation chromatography (GPC), is defined by the equation:

$M_w/M_n \leq (I_{10}/I_2)-4.63$, and is preferably between about 1.5 and 2.5. For substantially linear ethylene polymers, the $I_{10}/I_2$ ratio indicates the degree of long-chain branching, that is, the larger the $I_{10}/I_2$ ratio, the more long-chain branching in the polymer.

The unique characteristic of these homogeneously branched, substantially linear ethylene polymers is a highly unexpected flow property in which the $I_{10}/I_2$ value of the polymer is essentially independent of the polydispersity index (that is, $M_w/M_n$) of the polymer. This is contrasted with conventional linear homogeneously branched polyethylene resins (for example, those described by Elston in U.S. Pat. No. 3,645,992) and conventional linear heterogeneously branched polyethylene resins (for example, those prepared with a free radical initiator, such as low density polyethylene, or those prepared with a coordination catalyst, such as linear low density polyethylene) having rheological properties such that to increase the $I_{10}/I_2$ value, then the polydispersity index must also be increased.

Substantially linear olefin polymers have a critical shear rate at onset of surface melt fracture of at least 50 percent greater than the critical shear rate at the onset of surface melt fracture of a linear olefin polymer having about the same $I_2$, $M_w/M_n$ and density. "About the same" means that the values are within about ten (10) percent of one another.

The preferred melt flow index, or simply melt index, measured as $I_2$ (ASTM D-1238, condition 190/2.16 (formerly condition E)), is from 0.05 g/10 min to 200 g/10 min, more preferably 0.5 to 20 g/10 min. For example in the case of EPDM, a melt index range from 0.05 to 200 g/10 min corresponds approximately to a Mooney viscosity (ML (1+4), 121° C.) of <1 to 70. Typically, the preferred substantially linear ethylene polymers used in the practice of this invention are homogeneously branched and do not have any measurable high density fraction, that is, short-chain branching distribution as measured by Temperature Rising Elution Fractionation (which is described in U.S. Pat. No. 5,089,321) or stated in another manner, these polymers do not contain any polymer fraction that has a degree of branching less than or equal to 2 methyls/1000 carbons. These preferred substantially linear ethylene polymers also have a single differential scanning calorimetry (DSC) melting peak between −30° and 150° C. at a scan rate of 10° C./min using a second heat.

An apparent shear stress vs. apparent shear rate plot is used to identify the melt fracture phenomena. According to Ramamurthy in *Journal of Rheology*, 30(2), 337–357 (1986), above a certain critical flow rate, the observed extrudate irregularities may be broadly classified into two main types: surface melt fracture and gross melt fracture.

Surface melt fracture occurs under apparently steady flow conditions and ranges in detail from loss of specular gloss to the more severe form of "sharkskin". In this invention, the onset of surface melt fracture is characterized at the beginning of losing extrudate gloss at which the surface roughness of extrudate can only be detected by 40× or greater magnification. The critical shear rate at onset of surface melt fracture for the substantially linear ethylene polymers of this invention is at least 50 percent greater than the critical shear rate at the onset of surface melt fracture of a linear ethylene polymer having the about the same $I_2$, $M_w/M_n$ and density. Gross melt fracture occurs at unsteady flow conditions and ranges in detail from regular (alternating rough and smooth, helical, etc.) to random distortions.

The polyolefin elastomer component of the blends used in this invention include terpolymers, e.g. ethylene/propylene/ diene monomer (EPDM), tetrapolymers, and the like. The diene monomer component of these elastomers include both conjugated and nonconjugated dienes. Examples of nonconjugated dienes include aliphatic dienes such as 1,4-pentadiene, 1,4-hexadiene, 1,5-hexadiene, 2-methyl-1,5-hexadiene, 1,6-heptadiene, 6-methyl-1,5-heptadiene, 1,7-octadiene, 7-methyl-1,6-octadiene, 1,13-tetradecadiene, 1,19-eicosadiene, and the like; cyclic dienes such as 1,4-cyclohexadiene, bicyclo[2.2.1]hept-2,5-diene, 5-ethylidene-2-norbornene, 5-methylene-2-norbornene, 5-vinyl-2-norbornene, bicyclo[2.2.2]oct-2,5-diene, 4-vinylcyclohex-1-ene, bicyclo[2.2.2]oct-2,6-diene, 1,7,7-trimethylbicyclo [2.2.1]hept-2,5-diene, dicyclopentadiene, methyltetrahydroindene, 5-allylbicyclo[2.2.1]hept-2-ene, 1,5-cyclooctadiene, and the like; aromatic dienes such as 1,4-diallylbenzene, 4-allyl-1H-indene; and trienes such as 2,3-diisopropenylidene-5-norbornene, 2-ethylidene-3-isopropylidene-5-norbornene, 2-propenyl-2,5-norbornadiene, 1,3,7-octatriene, 1,4,9-decatriene, and the like; with 5-ethylidene-2-norbornene a preferred nonconjugated diene.

Examples of conjugated dienes include butadiene, isoprene, 2,3-dimethylbutadiene-1,3, 1,2-dimethylbutadiene-1,3, 1,4-dimethylbutadiene-1,3, 1-ethylbutadiene-1,3, 2-phenylbutadiene-1,3, hexadiene-1, 3,4-methylpentadiene-1,3, 1,3-pentadiene (CH$_3$CH=CH—CH=CH$_2$; commonly called piperylene), 3-methyl-1,3-pentadiene, 2,4-dimethyl-1,3-pentadiene, 3-ethyl-1,3-pentadiene, and the like; with 1,3-pentadiene a preferred conjugated diene.

Exemplary terpolymers include ethylene/propylene/5-ethylidene-2-norbornene, ethylene/1-octene/5-ethylidene-2norbornene, ethylene/propylene/1,3-pentadiene, and ethylene/1-octene/1,3-pentadiene. Exemplary tetrapolymers include ethylene/propylene/mixed dienes, e.g. ethylene/ propylene/5-ethylidene-2-norbornene/piperylene.

The crystalline polyolefin polymer component of the blend has a percent crystallinity of at least about 40%, preferably at least about 50% and more preferably at least about 60%, preferably in combination with a melting point of greater than about 100° C., more preferably greater than about 120° C. The percent crystallinity is determined by dividing the heat of fusion as determined by DSC of a polymer sample by the total heat of fusion for that polymer sample. Preferred crystalline polyolefins include high density polyethylene (as described above), and polypropylene. The total heat of fusion for high density homopolymer (i.e. 100% crystalline) polyethylene is 292 joule/gram (J/g), and the total heat of fusion for 100% crystalline polypropylene is 209 J/g.

If the crystalline polyolefin component of the blend of this invention is polypropylene, then it can be either a homopolymer or one or more copolymers of propylene and up to 20 mole percent ethylene or at least one α-olefin having up to about 12 carbon atoms. If a copolymer, then it can be random, block or graft, and it can be either isotactic or syndiotactic. The polypropylene component of this invention has a typical melt flow rate (as determined by ASTM D-1238, Procedure A Conditions E (for $I_2$) and N (for $I_{10}$), at a temperature of 230° C.) of between about 0.1 and about 100 g/10 min, and preferably between about 0.8 and about 30 g/10 min.

The blend composition can vary widely, but typically the polyolefin elastomer:crystalline polymer weight ratio is at least about 70:30, preferably at least about 80:20 and more preferably at least about 85:15. The polyolefin elastomer:crystalline polymer weight ratio typically does not exceed about 99:1.

Any silane, or a mixture of such silanes, that will effectively graft to and crosslink the components of the polymer composition can be used in the practice of this invention. Suitable silanes include unsaturated silanes that comprise an ethylenically unsaturated hydrocarbyl group, such as a vinyl, allyl, isopropenyl, butenyl, cyclohexenyl or γ-(meth) acryloxy allyl group, and a hydrolysable group, such as, for example, a hydrocarbyloxy, hydrocarbonyloxy, or hydrocarbylamino group. Examples of hydrolysable groups include methoxy, ethoxy, formyloxy, acetoxy, proprionyloxy, and alkyl or arylamino groups. Preferred silanes are the unsaturated alkoxy silanes which can be grafted onto the polymer. These silanes and their method of preparation are more fully described in U.S. Pat. No. 5,266,627 to Meverden, et al. Vinyl trimethoxy silane, vinyl triethoxy silane, γ-(meth) acryloxy propyl trimethoxy silane and mixtures of these silanes are the preferred silane crosslinkers for use in this invention. If a filler is present, then preferably the crosslinker includes vinyl triethoxy silane.

The amount of silane crosslinker used in the practice of this invention can vary widely depending upon the nature of the ethylene polymer, the silane, the processing conditions, the grafting efficiency, the ultimate application, and similar factors, but typically at least 0.1, preferably at least 0.5, parts per hundred resin (phr) is used. Considerations of convenience and economy are usually the two principal limitations on the maximum amount of silane crosslinker used in the practice of this invention, and typically the maximum amount of silane crosslinker does not exceed 5, preferably it does not exceed 2, phr. As used in parts per hundred resin or phr, "resin" means the elastomer plus crystalline polymer.

The silane crosslinker(s) is grafted to one or more of the polymers, i.e. the elastomer(s), the crystalline polyolefin polymer(s) or both, by any conventional method, typically in the presence of a free radical initiator e.g. peroxides and azo compounds, or by ionizing radiation, etc. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, and tert-butyl peracetate. A suitable azo compound is azobisisobutyl nitrite. The amount of initiator can vary, but it is typically present in an amount of at least 0.04, preferably at least 0.06, phr. Typically the initiator does not exceed 0.15, preferably it does not exceed about 0.10, phr. The ratio of silane crosslinker to initiator can also vary widely, but the typical crosslinker:initiator ratio is between 10:1 to 30:1, preferably between 18:1 and 24:1.

While any conventional method can be used to graft the silane crosslinker to the elastomer, crystalline polymer or both, one preferred method is blending the two with the initiator in the first stage of a reactor extruder, such as a single screw extruder, preferably one with a length/diameter (L/D) ratio of 25:1 or greater. The grafting conditions can vary, but the melt temperatures are typically between 160° and 260°, preferably between 190° and 230° C., depending upon the residence time and the half life of the initiator.

Cure is promoted with a cure or crosslinking catalyst, and any catalyst that will provide this function can be used in this invention. These catalysts generally include organic bases, carboxylic acids, and organometallic compounds including organic titanates and complexes or carboxylates of lead, cobalt, iron, nickel, zinc and tin. Dibutyl tin dilaurate, dioctyl tin maleate, dibutyl tin diacetate, dibutyl tin dioctoate, stannous acetate, stannous octoate, lead naphthenate, zinc caprylate, cobalt naphthenate; and the like. Tin carboxylate, especially dibutyl tin dilaurate and dioctyl tin maleate, and titanium compounds, especially titanium 2-ethylhexoxide, are particularly effective for this invention. The catalyst (or mixture of catalysts) is present in a catalytic amount, typically between about 0.015 and about 0.3 phr. The crosslinks that result from the cure process can form between two elastomer molecules, two crystalline polyolefin polymer molecules, and/or an elastomer molecule and a crystalline polyolefin polymer molecule.

The articles prepared from the crosslinked compositions of this invention can be filled or unfilled. If filled, then the amount of filler present should not exceed an amount that would cause degradation of the properties of interest in crosslinked composition. Typically, the amount of filler present is between 5 and 80, preferably between 5 and 50, weight percent (wt %) based on the weight of the composition. Representative fillers include kaolin clay, magnesium hydroxide, silica, calcium carbonate. In a preferred embodiment of this invention in which a filler is present, the filler is coated with a material that will prevent or retard any tendency that the filler might otherwise have to interfere with the silane cure reaction. Stearic acid is illustrative of such a filler coating.

Other additives can be used in the preparation of and be present in the articles prepared from the crosslinked compositions of this invention, and include antioxidants, processing aids, oils, plastiziers, pigments and lubricants.

Typical applications for crosslinkable articles produced from the blends of this invention include automotive weatherstrip and O-ring gaskets, wire and cable insulation, footwear components, films and fiber reinforced sheeting, flexible hose and tubing.

The cable insulation embodiment of this invention can be applied to a cable in known amounts and by known methods (for example, with the equipment and methods described in U.S. Pat. No. 5,246,783 and U.S. Pat. No. 4,144,202). Typically, the cable insulation is prepared in a reactor-extruder equipped with a cable-coating die and after the components of the insulation are formulated, the insulation composition is extruded over the cable as the cable is drawn through the die. In a preferred embodiment of this invention in which the elastomer has an $I_2$ of about 0.05 to about 7 g/10 min, the insulation coated onto the cable will cure in 1 to 10 days when exposed to moisture at ambient temperature, especially when immersed in water.

In another embodiment of this invention, the silane-grafted substantially linear ethylene polymers are shaped into automotive weatherstripping. This weatherstripping is useful as a sealing system for doors, trunks, belt lines, hoods, and similar items. These materials are clear or highly opaque, are easily colored through the incorporation of known pigments, and can be processed on conventional thermoplastic equipment. In comparison, conventional sulfur-cured EPDM weatherstripping must be crosslinked in a less efficient (heat activated) process using traditional rubber (thermoset) equipment, is opaque and difficult to color match, and can lead to difficulties in forming parts if the parts are formed using a conventional thermoplastic process.

In yet another embodiment of this invention, the silane-grafted substantially linear ethylene polymers are shaped into fibers. These fibers exhibit improved heat resistance and low shrink performance properties. These fibers are readily crosslinked upon exposure to moisture which can be effected by immersion in water or by exposure to atmospheric moisture. The permanent set elongation data shown by these crosslinked elastic fibers exhibit superior elastic behavior at elevated temperatures (e.g. 150° C.) while maintaining low shrink performance. This unique combination of elastic behavior and low shrink at elevated temperatures have utility in fabricated articles such as woven and non-woven fabric (e.g. washable clothing), elastic string (e.g. woven elastic strap), elastic filters for air/water filtration (e.g. non-woven air cleaners), and fiber matts (e.g. non-woven carpet underlayment).

The following examples are illustrative of certain specific embodiments of this invention. Unless indicated otherwise, all parts and percentages are by weight.

SPECIFIC EMBODIMENTS

Polyolefin Elastomers

The polyolefin elastomers described in Table I are grafted with vinyl trimethoxy silane (VTMOS) using dicumyl peroxide (DCP) as the free radical initiator and dibutyl tin dilaurate (DBTDL) as a catalyst. The VTMOS : DBTDL weight ratio is 40:1. The polymer composition is placed in a container to which is added a solution of the VTMOS, DCP and DBTDL in concentrations as described in Tables V–VII, the container sealed, and the contents mixed for 1 hour. The contents of the container are then transferred to a small Haake single-screw extruder (0.75 in. diameter, 25:1 L/D), and the extruder is operated at the conditions described in Table II.

TABLE I

Description of Polyolefin Elastomers

| Elastomer No. | Elastomer Description* | Melt Index (g/10 min at 190° C.) | Mooney Viscosity (ML 1 + 4 at 125° C.) | Crystallinity (%, DSC) | Density (g/cc) | Molecular Weight Distribution | Melt Flow Ratio ($I_{10}/I_2$) | Critical Shear Rate at Onset of Surface Melt Fracture ($sec^{-1}$) |
|---|---|---|---|---|---|---|---|---|
| E1 | Ethylene (65)/ 1-Octene (35) | 0.5 | ND | 10 | 0.868 | 2.03 | 7.4 | 385 |
| E2 | Ethylene (61)/ 1-Octene (39) | 0.5 | ND | 7 | 0.683 | 2 | 7.3 | 101 |
| E3 | Ethylene (ND)/ 1-Octene (ND) | 0.7 | ND | 2.8 | 0.855 | 2 | ND | ND |
| E4 | Ethylene (59)/ 1-Octene (41) | 1 | ND | 5.7 | 0.858 | 2 | 7.5 | 185 |
| E5 | Ethylene (70)/Propylene (25)/5-Ethylidene-2-Norbornene (5) | ND | 60 | 12 | 0.88 | ND | ND | ND |

*The number in parenthesis denotes in weight percent the amount of the component in the elastomer
ND - Not Determined

TABLE II

Extruder Operating Conditions

| Parameter | Setting |
|---|---|
| Barrel Temp. (C.) - Zone 1 | 140 |
| Barrel Temp. (C.) - Zone 2 | 160 |
| Barrel Temp. (C.) - Zone 3 | 205 |
| Barrel Temp. (C.) - Zone 4 | 205 |
| Die Adapter Temp. (C.) | 210 |
| Extruder Pres. (psi) | 400 |
| Screw rpm | 50 |
| Output (kg/hr) | 1 |
| Melt Temp. (C.) | 220 |

Each polyolefin elastomer is grafted with a known amount of silane which varies between 1.2 to 1.8% (by weight as VTMOS). Each silane-grafted elastomer sample is compression molded into an approximately 80 mil thick plaque which is then immersed in a warm (about 60° C.) distilled water bath for 96 hours to effect crosslinking.

After the plaques are recovered from the bath, each is tested for tensile strength and compression set performance. The tensile strength data are obtained using the ASTM D-412 test method. The compression set data are obtained by using the standard ASTM D-395 test method (70° C. for 22 hours using Test Method B) and a modified version of this test method (70° C. for 22 hours using Test Method B except the samples are allowed to cool to room temperature while under compression; after four hours, the samples are removed from the compression device and allowed to rest for 30 minutes before measurements are taken). This modified ASTM compression set method is used to simulate the effect of a temperature cycle on the compression set performance of elastomeric materials. Examples of elastomeric materials that experience a temperature cycle while under load (i.e. compression) include engine component gaskets and hoses, automotive seals and other sealing devices, and automotive and other tires.

The tensile strength and compression set data are reported in Tables V, VI and VII.

Blends

The crystalline polyolefin polymers which are used in these blend compositions are described in Table III. Table IV reports polymer compositions comprising an elastomer from Table I and a crystalline polyolefin polymer from Table III, these compositions grafted with VTMOS. The elastomer and crystalline polymer compositions are prepared in the same manner as are the elastomers reported above. The silane grafting conditions are identical to those reported in Table II, as is the amount (1.2 to 1.8% by weight of VTMOS) of silane grafted onto the blend components. Using the same techniques and conditions as are used with the previous samples, each blend is compression molded into an approximately 80 mil thick plaque, crosslinked, and then measured for tensile strength and compression set.

TABLE III

Description of Elastomer - Crystalline Polymer Blends

| Crystalline Polymer No. | Crystalline Polymer Description* | Melt Index (g/10 min at 190° C.) | Crystallinity (%, DSC) | Density (g/cc) | Molecular Weight Distribution |
|---|---|---|---|---|---|
| CP1 | HDPE Homopolymer | 1 | 60 | 0.965 | 4.9 |
| CP2 | HDPE Copolymer | 60 | 60 | 0.963 | 3.9 |

TABLE III-continued

Description of Elastomer - Crystalline Polymer Blends

| Crystalline Polymer No. | Crystalline Polymer Description* | Melt Index (g/10 min at 190° C.) | Crystallinity (%, DSC) | Density (g/cc) | Molecular Weight Distribution |
|---|---|---|---|---|---|
| CP3 | (Ethylene (>99)/1-octene (<1)) HDPE Copolymer | 65 | 60 | 0.953 | 3 |
| CP4 | (Ethylene (>99)/1-Octene (<1)) Polypropylene Homopolymer | ND | 65 | 0.900 | ND |

*The number in parenthesis denotes in weight percent the amount of the component in the crystalline polymer.
ND - Not Determined.

TABLE IV

Description of Crystalline Polymers

| Blend No. | Elastomer No. (wt %)* | Crystalline Polymer No. (wt %)* | Melt Index (g/10 min. at 190° C.) | Crystallinity (%, DSC) | Density (g/cc) |
|---|---|---|---|---|---|
| B1 | E3 (93) | CP1 (7) | 0.8 | 7 | 0.862 |
| B2 | E5 (93) | CP2 (7) | ND | 15.4 | 0.885 |
| B3 | E4 (93) | CP2 (7) | 1.4 | 9.5 | 0.865 |
| B4 | E4 (93) | CP3 (7) | 1.4 | 9.5 | 0.864 |
| B5 | E3 (85) | CP4 (15) | ND | 12.1 | 0.862 |

The tensile strength and compression set data are reported in Tables V, VI and VII.

TABLE V

Tensile Strength and Compression Set Data of Silane Grafted and Crosslinked Samples
(Effect of Density and Crystallinity)

| Silane Crosslinked Sample (- g - Si)* | % VTMOS (by wt.) | Density (g/cc) | Crystallinity (%, by DSC) | Tensile Strength (psi) | Compression Set (%) ASTM | vs. Modified |
|---|---|---|---|---|---|---|
| E1 - g - Si | 1.2 | 0.868 | 10 | ND | 32 | 100 |
| E2 - g - Si | 1.2 | 0.863 | 7.0 | 477 | 22 | 92 |
| E3 - g - Si | 1.2 | 0.855 | 2.8 | 313 | 23 | 64 |
| E4 - g - Si | 1.2 | 0.862 | 7.0 | 530 | 24 | 68 |

ND - not determined
*- g - Si means silane grafted.

TABLE VI

Tensile Strength and Modified Compression Set Data of Silane Grafted and Crosslinked Samples
(Alternative Elastomer Compositions)

| Silane Crosslinked Sample (-g-Si*) | % VTMOS (by wt.) | Density (g/cc) | Tensile Strength (psi) | Compression Set (%) Modified |
|---|---|---|---|---|
| E5 - g - Si Vistalon 7000 | 1.5 | 0.88 | 1149 | 94 |
| B2 - g - Si | 1.5 | 0.885 | 1305 | 89 |

*- g - Si means silane grafted.

Figure 1:
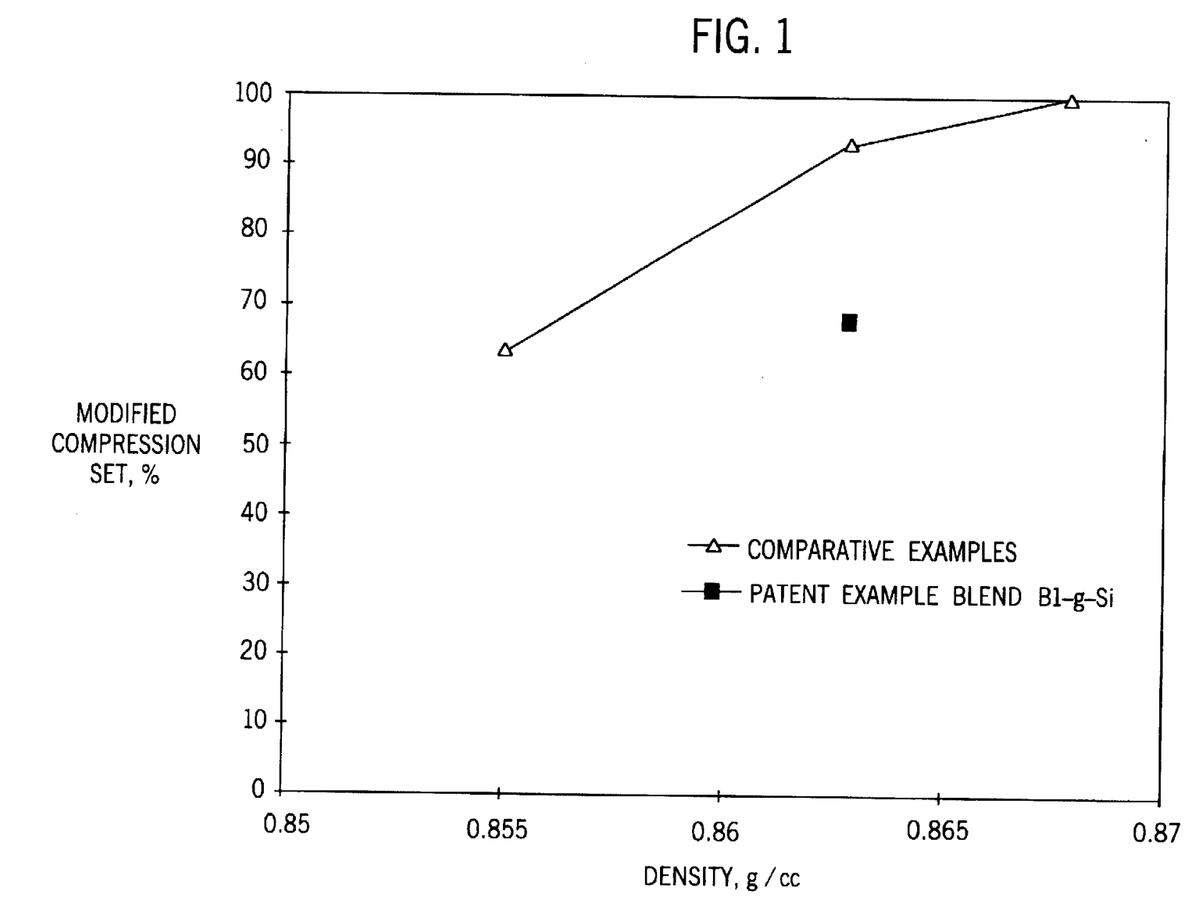
FIG. 1 is a plot describing the effect of density on compression set.
Figure 2:
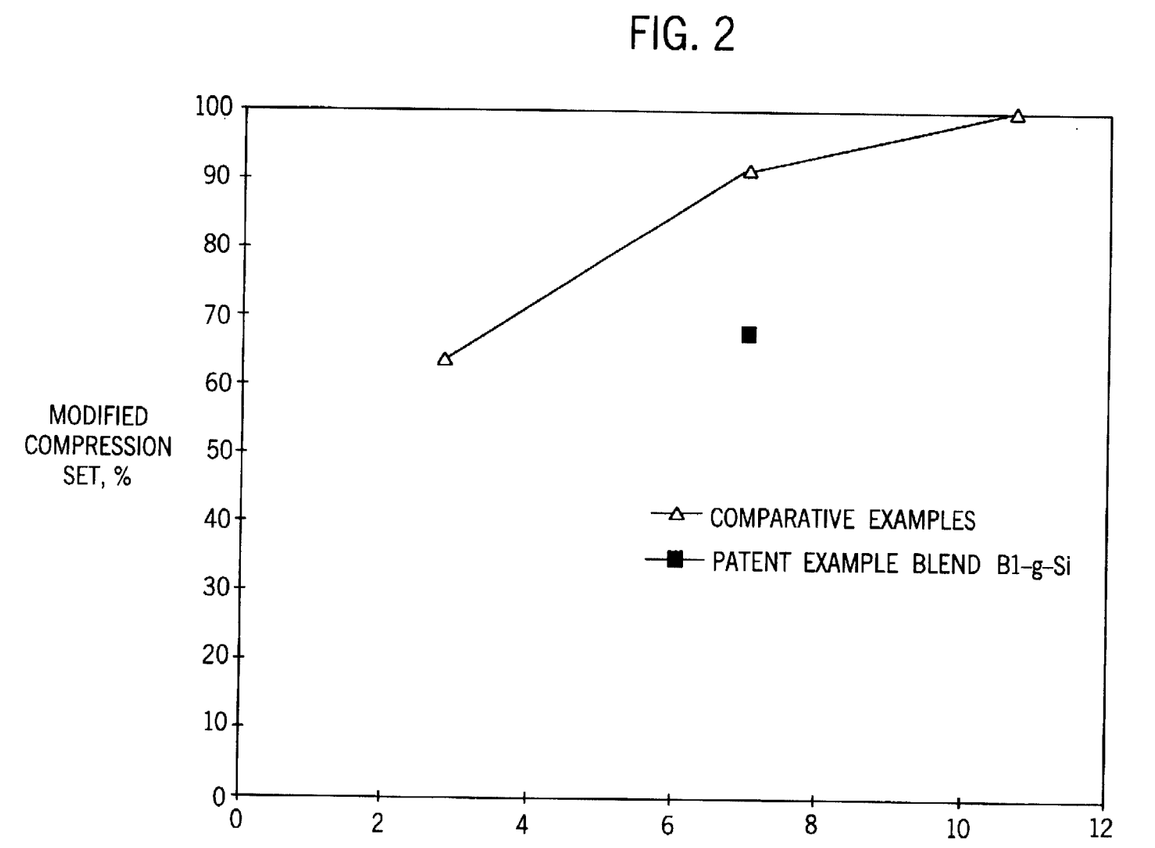
FIG. 2 is a plot describing the effect of crystallinity on compression set.

As the data in Table V shows, the tensile strength of BlendNo. 1 is higher than that of ElastomerNo. 2, i.e. the silane-grafted elastomer with a similar density and crystallinity. As to compression set, the ASTM data show these two samples to have very similar performance. The effect of the density and crystallinity on compression set performance is shown through the modified ASTM test. These data points are plotted as a function of density in FIG. 1 and as a function of crystallinity in FIG. 2. These plots report that the modified compression set of Blend No. 1 is superior (the lower the compression set values, the better the performance), to that of Elastomer No. 2.

The data in Table VI shows similar improvements in tensile strength and modified compression set performance for alternative elastomer compositions.

TABLE VII

Tensile Strength and Modified Compression Set Data of Silane Grafted and Crosslinked Samples
(Alternative HDPE Compositions)

| Silane Crosslinked Sample (- g - Si*) | % VTMOS (by wt.) | Density (g/cc) | Crystallinity (%, by DSC) | Tensile Strength (psi) | Compression Set (%) Modified |
|---|---|---|---|---|---|
| E4 - g - Si | 1.8 | 0.858 | 5.7 | 295 | 35 |
| B3 - g - Si | 1.8 | 0.865 | 9.5 | 481 | 44 |
| B4 - g - Si | 1.8 | 0.864 | 9.5 | 469 | 50 |
| B5 - g - Si | 1.8 | 0.862 | 12.1 | 490 | 51 |

The data in Table VII shows improved tensile strength performance for Blend Nos. 3–5. In addition, these blends have lower than expected modified compression set performance based on the density and percent crystallinity values.

Although the invention has been described in considerable detail through the preceding examples, these examples are for purposes of illustration only. Many variations and modifications can be made by one skilled in the art without departing from the spirit and scope of the invention as described in the following claims.

What is claimed is:

1. A silane-crosslinked blend comprising (a) a polyolefin elastomer with a density of less than 0.885 g/cc, (b) a crystalline polyolefin polymer with a percent crystallinity of at least about 40%, and (c) a silane crosslinker, the polyolefin elastomer comprising at least about 70 weight percent of the total weight of the blend.

2. The blend of claim 1 in which the polyolefin elastomer is at least one of an ethylene/α-olefin copolymer and an ethylene/α-olefin/diene terpolymer.

3. The blend of claim 2 in which the crystalline polyolefin polymer has a melting point in excess of about 100° C.

4. The blend of claim 3 in which the crystalline polyolefin polymer is at least one of high density polyethylene or a crystalline polypropylene with a percent crystallinity of at least about 60%.

5. The blend of claim 4 in which the polyolefin elastomer is a substantially linear ethylene/α-olefin copolymer characterized as having:

(a) a melt flow ratio, $I_{10}/I_2 \geq 5.63$;

(b) a molecular weight distribution, $M_w/M_n$, defined by the equation:

$M_w/M_n \leq (I_{10}/I_2) - 4.63$; and (c) a critical shear rate at onset of surface melt fracture of at least 50 percent greater than the critical shear rate at the onset of surface melt fracture of a linear olefin polymer having about the same $I_2$, $M_w/M_n$ and density.

6. The blend of claim 4 in which the polyolefin elastomer is a terpolymer comprising (a) ethylene, (b) a $C_3$—$C_8$ α—olefin, and (c) a diene selected from the group consisting of dicyclopentadiene, 1,4-hexadiene, piperylene and 5-ethylidene-2-norbornene.

7. The blend of claim 1 in which the crystalline polyolefin polymer is high density polyethylene.

8. The blend of claim 1 in which the silane crosslinker is of the formula:

in which R' is a hydrogen atom or methyl group; x and y are 0 or 1 with the proviso that when x is 1, y is 1; n is an integer from 1 to 12 inclusive, preferably 1 to 4, and each R independently is a hydrolysable organic group, with the proviso that not more than one of the three R groups is an alkyl group.

9. The blend of claim 8 in which each R is selected from the group consisting of an alkoxy group having from 1 to 12 carbon atoms, an aryloxy group, an aralkoxy group, an aliphatic acyloxy group having from 1 to 12 carbon atoms, an amino or substituted amino group, and a lower alkyl group having 1 to 6 carbon atoms inclusive.

10. The blend of claim 9 in which the silane crosslinker is vinyl trimethoxysilane or vinyl triethoxysilane.

11. A silane-crosslinkable blend comprising (a) a polyolefin elastomer with a density of less than 0.885 g/cc, (b) a crystalline polyolefin polymer with a percent crystallinity of at least about 40%, and (c) a silane crosslinker, the polyolefin elastomer comprising at least about 70 weight percent of the total weight of the blend.

12. A process for making an article comprising a silane-crosslinked blend comprising (a) at least about 70 weight percent of the total weight of the blend of a polyolefin elastomer with a density of less than 0.885 g/cc, (b) a crystalline polyolefin polymer with a percent crystallinity of at least about 40%, and (c) a silane crosslinker, the process comprising the steps of (i) blending the polyolefin elastomer with the crystalline polyolefin polymer, (ii) grafting the blend with a silane crosslinker, (iii) shaping the silane-grafted blend into the article, and (iv) curing the shaped, silane-grafted blend with water.

13. A process for making an article comprising a silane-crosslinked blend comprising (a) at least about 70 weight percent of the total weight of the blend of a polyolefin elastomer with a density of less than 0.885 g/cc, (b) a crystalline polyolefin polymer with a percent crystallinity of at least about 40%, and (c) a silane crosslinker, the process comprising the steps of (i) blending the polyolefin elastomer with the crystalline polyolefin polymer, (ii) simultaneously grafting with a silane crosslinker and shaping the blend into the article, and (iii) curing the shaped, silane-grafted blend with water.

14. The process of claim 12 or 13 in which the silane grafting is conducted with a peroxide initiator and in the presence of a cure catalyst.

15. The process of claim 14 in which the cure catalyst is a tin carboxylate.

16. An article comprising a silane-crosslinked blend comprising (a) at least about 70 weight percent of the total weight of the article of a polyolefin elastomer with a density of less than 0.885 g/cc, (b) a crystalline polyolefin polymer with a percent crystallinity of at least about 40%, and (c) a silane crosslinker.

17. The article of claim 16 in the shape of a sheath about a wire or cable, flexible weatherstrip, fiber, a footwear component, hose or gasket.

18. An article made by a process comprising the steps of (i) blending (a) a polyolefin elastomer with a density of less than 0.885 g/cc, (b) a crystalline polyolefin polymer with a percent crystallinity of at least about 40%, and (c) a silane crosslinker, (ii) grafting the blend with a silane crosslinker, (iii) shaping the silane-grafted blend into the article, and (iv) curing the shaped, silane-grafted blend with water, the polyolefin elastomer comprising at least about 70 weight percent total weight of the article.

19. An article made by a process comprising the steps of (i) blending (a) a polyolefin elastomer with a density of less than 0.885 g/cc, (b) a crystalline polyolefin polymer with a percent crystallinity of at least about 40%, and (c) a silane crosslinker, (ii) simultaneously grafting with a silane crosslinker and shaping the blend into the article, and (iii) curing the shaped, silane-grafted blend with water, the polyolefin elastomer comprising at least about 70 weight percent total weight of the article.

* * * * *